US011655869B2

(12) United States Patent
Heman et al.

(10) Patent No.: US 11,655,869 B2
(45) Date of Patent: May 23, 2023

(54) BRAKE ADJUSTER WITH BRAKE STROKE INDICATOR

(71) Applicant: HALDEX BRAKE PRODUCTS CORPORATION, Kansas City, MO (US)

(72) Inventors: Glen Heman, Levasy, MO (US); Chad Collins, Kansas City, MO (US)

(73) Assignee: HALDEX BRAKE PRODUCTS CORPORATION, Kansas City, MO (US)

( * ) Notice: Subject to any disclaimer, the term of this patent is extended or adjusted under 35 U.S.C. 154(b) by 74 days.

(21) Appl. No.: 17/366,611

(22) Filed: Jul. 2, 2021

(65) Prior Publication Data

US 2022/0010854 A1   Jan. 13, 2022

Related U.S. Application Data

(60) Provisional application No. 63/050,180, filed on Jul. 10, 2020.

(51) Int. Cl.
*F16D 65/58* (2006.01)
*F16D 65/60* (2006.01)
(Continued)

(52) U.S. Cl.
CPC ............ *F16D 65/58* (2013.01); *F16D 65/60* (2013.01); *F16D 66/02* (2013.01); *F16D 2125/42* (2013.01)

(58) Field of Classification Search
CPC .......... F16D 66/02; F16D 65/58; F16D 65/60; F16D 2066/003; F16D 2125/42
See application file for complete search history.

(56) References Cited

U.S. PATENT DOCUMENTS 2,379,796 A * 7/1945 Freeman ................ F16D 65/60
74/522
2,522,903 A * 9/1950 Shively .................. F16D 65/60
188/196 R (Continued)

FOREIGN PATENT DOCUMENTS

CN    113623344 A * 11/2021 ............. F16D 65/22
EP     2584212 A1 *  4/2013 ........... F16D 65/092

OTHER PUBLICATIONS

Brake Sentry, How Visual Brake Stroke Adjustment Indicators Work, https://brakesentry.com/how-visual-brake-stroke-indicators-work/, Sep. 9, 2021, 5 pages.

(Continued)

*Primary Examiner* — Thomas J Williams
(74) *Attorney, Agent, or Firm* — Stinson LLP

(57) ABSTRACT

A brake adjuster with a housing configured to be coupled to a brake actuator push rod, and a control unit rotatably coupled to the housing. The control unit is configured to be coupled to a reference point of a vehicle and to cause adjustment of the brake as the brake actuator push rod retracts. One of the housing and the control unit has a first indicator and a second indicator, and the other of the housing and the control unit has a third indicator. The third indicator is adjacent the first indicator when the brake actuator push rod is retracted in a brake disengaged position, and the third indicator is adjacent the second indicator when the brake actuator push rod is extended to a brake over-stroke position. The indicators may be any combination of notches, protrusions, marks, or pointers.

19 Claims, 11 Drawing Sheets

(51) Int. Cl.
*F16D 66/02* (2006.01)
*F16D 125/42* (2012.01)

(56) References Cited

U.S. PATENT DOCUMENTS

| | | | |
|---|---|---|---|
| 5,327,999 A | 7/1994 | Nelander | |
| 5,535,854 A * | 7/1996 | Prince | F16D 65/60 |
| | | | 188/1.11 R |
| 5,762,165 A | 6/1998 | Crewson | |
| 6,059,074 A | 5/2000 | Crewson | |
| 6,390,244 B1 | 5/2002 | Sitter | |
| 7,222,699 B2 * | 5/2007 | Salazar | F16D 66/02 |
| | | | 188/1.11 W |
| 7,963,373 B2 * | 6/2011 | Salazar | F16D 66/00 |
| | | | 188/1.11 R |
| 9,447,832 B2 | 9/2016 | Todd et al. | |
| 10,197,123 B2 | 2/2019 | Drake | |
| 10,527,119 B2 | 1/2020 | Drake | |
| 2022/0010854 A1 * | 1/2022 | Heman | F16D 66/02 |

OTHER PUBLICATIONS

Tectran, Brake Safe®—Universal Kits, Product Bulletin, 2018, 1 page, Tectran USA.
TSE Brakes, TSE Brakes Introduces New Brake Adjuster With Stroke Indicator., News Release, Mar. 18, 2019, 1 page, TSE Brakes USA.

* cited by examiner

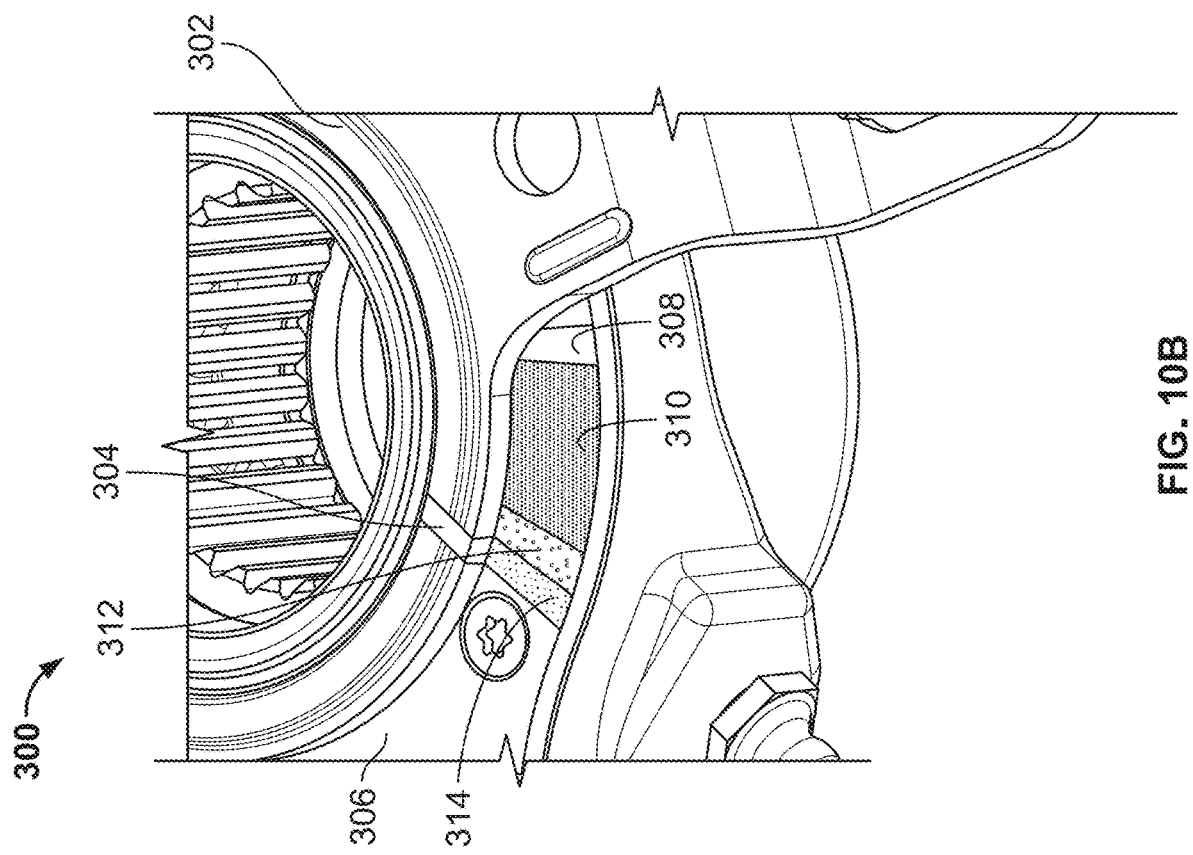
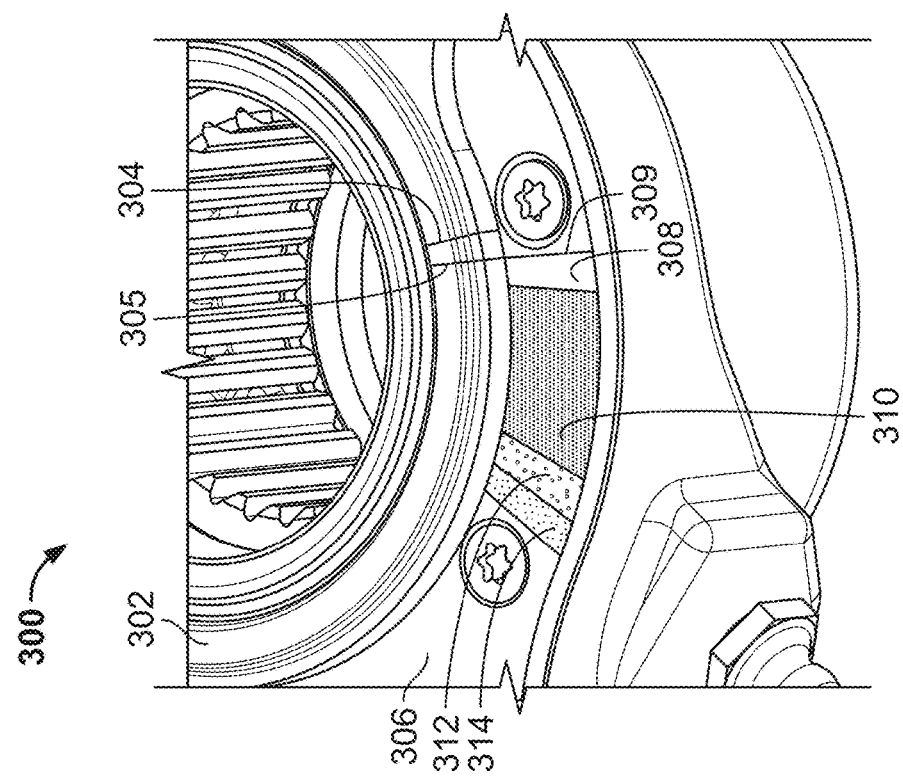

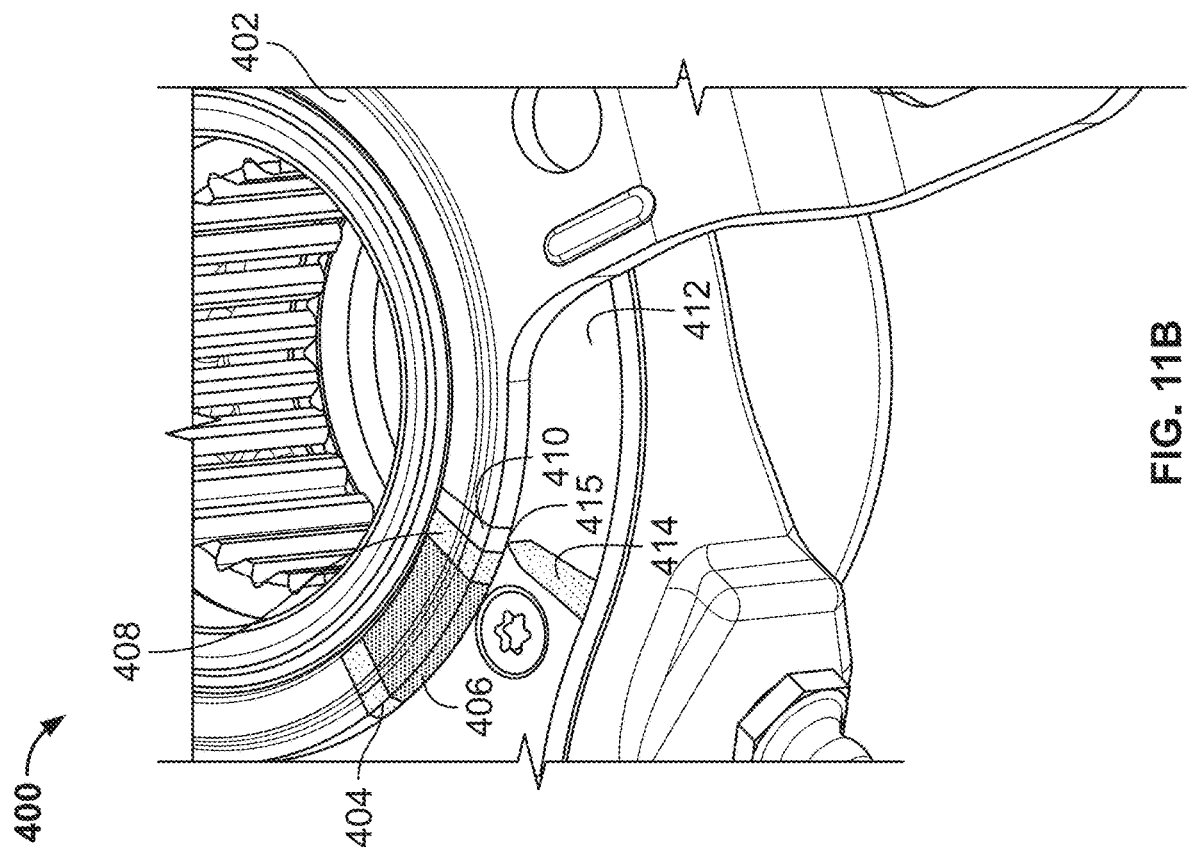
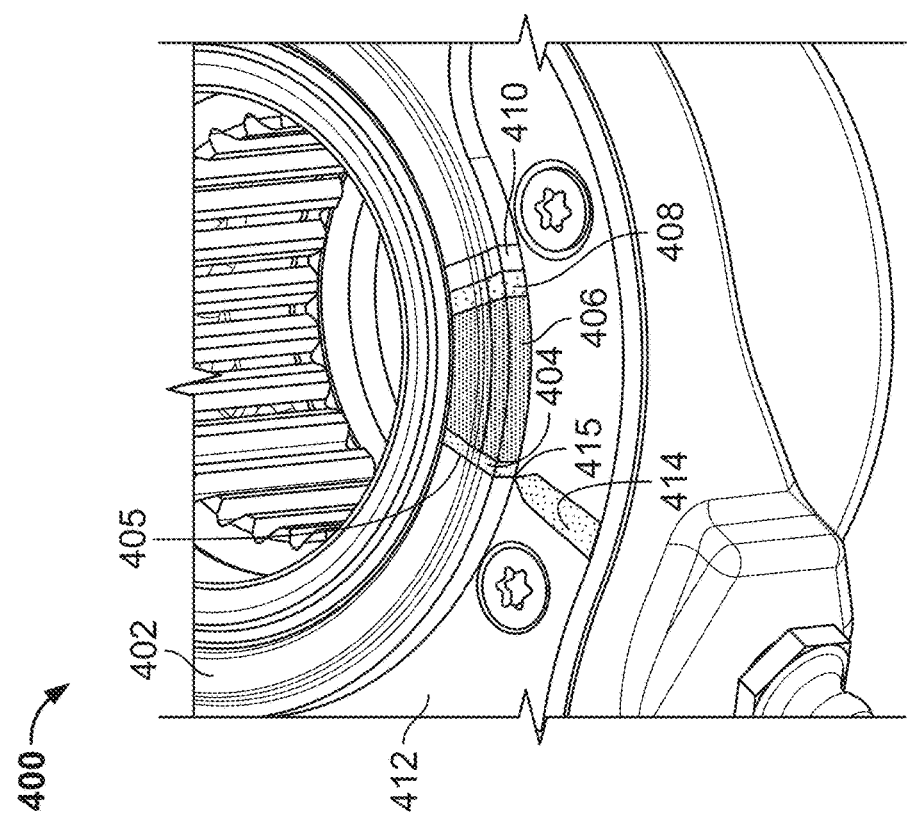

BRAKE ADJUSTER WITH BRAKE STROKE INDICATOR

CROSS-REFERENCE TO RELATED APPLICATIONS

This application is based on and claims priority to U.S. Provisional Application Ser. No. 63/050,180, filed on Jul. 10, 2020, which is incorporated herein by reference in its entirety.

BACKGROUND OF THE INVENTION

1. Field of the Invention

The present invention is directed to a brake adjuster for use in a heavy duty vehicle air braking system and, more specifically, to a brake adjuster having a brake stroke indicator.

2. Description of Related Art

A pneumatic braking system for a heavy duty vehicle typically includes a brake adjuster to transfer force between a brake actuator and a brake shoe or brake pad. For a vehicle having drum brakes, the brake adjuster is typically connected to an S-cam shaft. When the brake actuator applies force to the brake adjuster, the adjuster rotates the S-cam shaft to press the brake shoes against the brake drum and apply the brakes. The brake shoes have brake linings that wear over time. As the brake linings wear, the brake adjuster maintains a desired clearance between the brake shoe and the brake drum. The brake adjuster has a control unit coupled to a fixed reference point on the vehicle that senses when the brake adjuster has rotated more than a desired amount due to wear of the brake linings. The control unit is coupled to a gear adjustment system of the brake adjuster that rotates the S-cam shaft to adjust the clearance between the brake shoes and brake drum when it exceeds a desired amount.

It is important to monitor the stroke of the brake actuator during use to ensure that the push rod of the brake actuator does not extend beyond its normal operating range of extension during use. When the push rod extends farther outward than its normal operating range of extension, the brake actuator is in an over-stroke condition, which leads to longer stopping distances. Further, when the brake actuator is in an over-stroke condition, the vehicle may be taken out of service and the driver issued a citation during a road-side inspection.

A few types of brake actuator stroke monitoring systems have been developed. One such system includes a plastic pointer that is rotatably mounted to the brake adjuster at the connection point between the brake actuator push rod and the brake adjuster. A color-coded gauge is placed on the arm of the brake adjuster. As the brake actuator push rod extends, the pointer rotates with respect to the gauge to indicate the distance of extension of the push rod. When the brake actuator is in an over-stroke condition, the pointer points to an area of the gauge that is colored to indicate that the brake actuator is in an over-stroke condition. While these types of stroke monitoring systems generally work for their intended purpose, the plastic pointer that is coupled to the brake adjuster may be damaged or knocked out of position during operation of the vehicle. Further, the plastic pointer is limited to use with brake adjusters having zero-degree arm inclinations and zero-inch arm offsets. In addition, the plastic indicator may be "handed," meaning that a unique indicator may be needed for a right-hand installation versus a left-hand installation of the brake adjuster.

Another type of stroke monitoring system includes sensors installed within the brake actuator to determine if the brake stroke is operating within a normal range or is in an over-stroke condition. Data from the sensors is transmitted to a vehicle on-board data recording and reporting system. While these systems are generally convenient, they are also relatively expensive and may be difficult to diagnose and repair if working improperly. There are also stroke monitoring systems that consist of scales or rulers coupled to the brake actuator. As mentioned above with respect to the plastic pointer, these types of systems may be damaged or knocked out of position during operation of the vehicle.

BRIEF SUMMARY OF THE INVENTION

A brake adjuster in accordance with an exemplary embodiment of the invention described herein includes a housing configured to be coupled to a brake actuator push rod, and a control unit rotatably coupled to the housing. The control unit is configured to be coupled to a reference point of a vehicle such that the housing rotates with respect to the control unit as the brake actuator push rod extends outward to apply a brake of the vehicle and retracts to disengage the brake. The control unit is also configured to cause adjustment of the brake as the brake actuator push rod retracts. One of the housing and the control unit has a first indicator and a second indicator, and the other of the housing and the control unit has a third indicator. The third indicator is adjacent the first indicator when the brake actuator push rod is retracted in a brake disengaged position, and the third indicator is adjacent the second indicator when the brake actuator push rod is extended to a brake over-stroke position.

The first indicator, second indicator, and third indicator may be any combination of notches, protrusions, marks, or pointers. The first indicator, second indicator, and third indicator may be colored marks and may be formed from paint, decals, or other types of colored markings.

The first and second indicators may be on the housing or a cover plate of the housing, while the third indicator is on the control unit. Alternatively, the first and second indicators may be on the control unit, while the third indicator is on the housing or the cover plate of the housing.

The position of the third indicator with respect to the first and second indicators provides a visual indication of the brake stroke without the need for a scale or ruler to perform a manual measurement. Use of the stroke indicator system may reduce inspection failures, reduce unexpected brake system failures on the road, and reduce maintenance expenses. Further, because the indicators are positioned on or formed in the housing and the control unit of the brake adjuster, a separate part does not need to be coupled to the brake adjuster, thereby making the indication system of the brake adjuster less prone to breakage and failure. Positioning the indicators on the housing and control unit also may allow them to be used with brake adjusters having non-zero degree arm inclinations and non-zero arm offsets, i.e., non-zero inclination or offset of the arm with respect to a base of the adjuster. In addition, positioning the indicators on the housing and control unit may allow an operator or maintenance technician to view the relative position of the indicators from the side of the brake adjuster in addition to viewing them from the front of the brake adjuster. Thus, the relative position of the indicators may be viewable when the brake adjuster is installed in either a left-hand configuration or a right-hand configuration.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 10A is a detail view of the brake adjuster shown in FIG. 9 showing the brake adjuster when a brake actuator push rod is retracted in a brake disengaged position;

FIG. 10B is a detail view of the brake adjuster shown in FIG. 9 showing the brake adjuster when the brake actuator push rod is extended to a brake over-stroke position;

FIG. 11A is a detail view of a fourth embodiment of brake adjuster in accordance with the invention disclosed herein showing the brake adjuster when a brake actuator push rod is retracted in a brake disengaged position;

FIG. 11B is a detail view of the brake adjuster shown in FIG. 11A showing the brake adjuster when the brake actuator push rod is extended to a brake over-stroke position.

DETAILED DESCRIPTION OF PREFERRED EMBODIMENT

Figure 1:
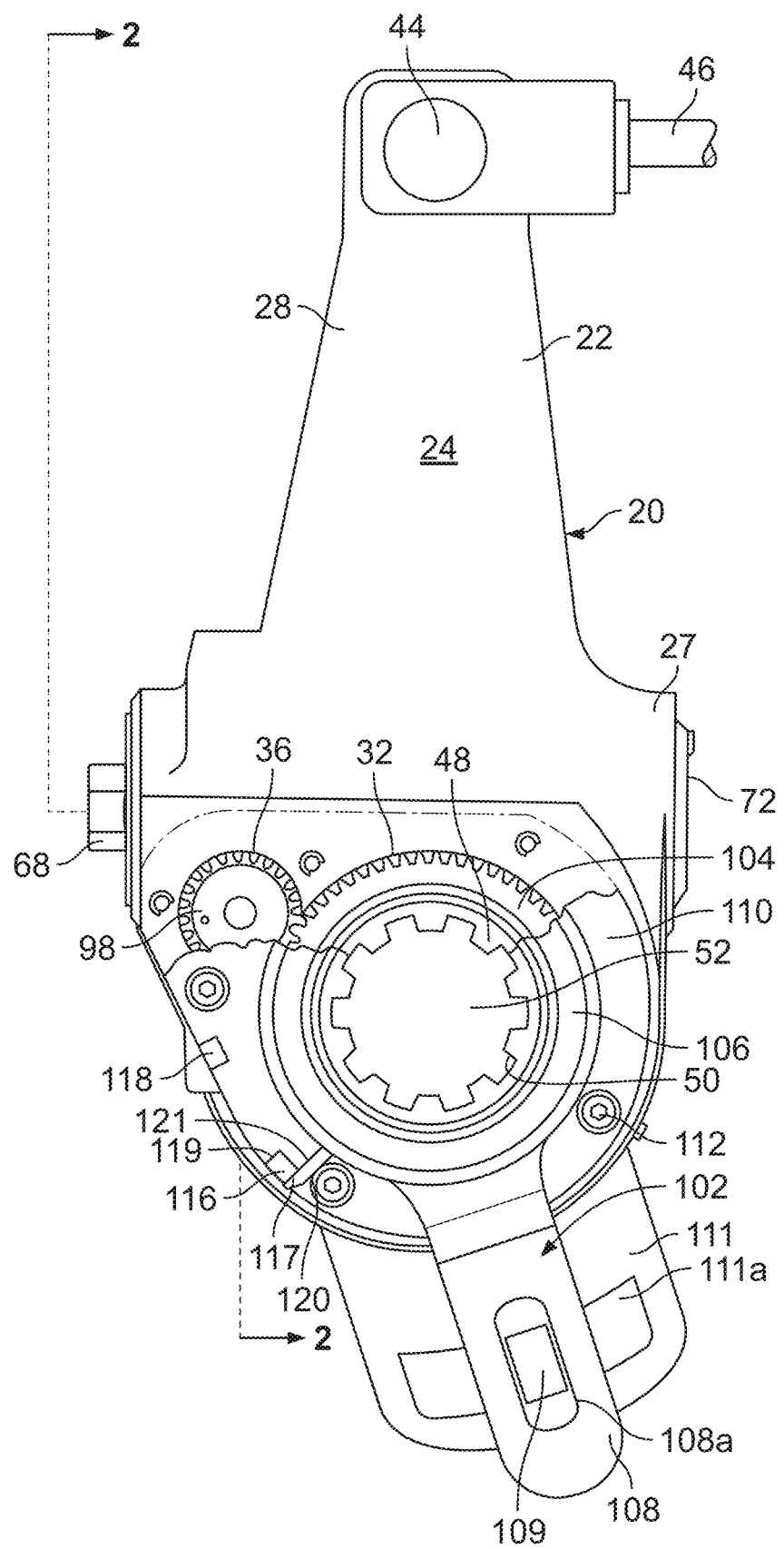
FIG. 1 is a front elevational view of a brake adjuster in accordance with one embodiment of the invention disclosed herein showing the brake adjuster when a brake actuator push rod is retracted in a brake disengaged position.

A brake adjuster in accordance with an exemplary embodiment of the invention disclosed herein is shown generally as 20 in FIG. 1. Brake adjuster 20 is connected to a brake actuator (not shown) and cam shaft (not shown) for transmitting force from the brake actuator to the shaft and applying a brake on a vehicle. Further, as brake adjuster 20 operates, it automatically adjusts the slack between brake shoes (not shown) and a brake drum (not shown) to maintain the slack at a desired amount, as described below. Brake adjuster 20 is preferably used with a heavy duty vehicle having a pneumatic braking system, such as a bus, truck, trailer, dolly, semi-truck, semi-trailer, train, construction equipment, tractor, farm equipment, or recreational vehicle. Further, as described in more detail below, brake adjuster 20 has a visual brake stroke indication system that allows an operator or maintenance technician to visually determine the length of the stroke of the brake actuator push rod 46, which allows the operator or technician to determine whether the brake adjuster 20 is installed correctly and maintaining proper brake adjustment.

Figure 3:
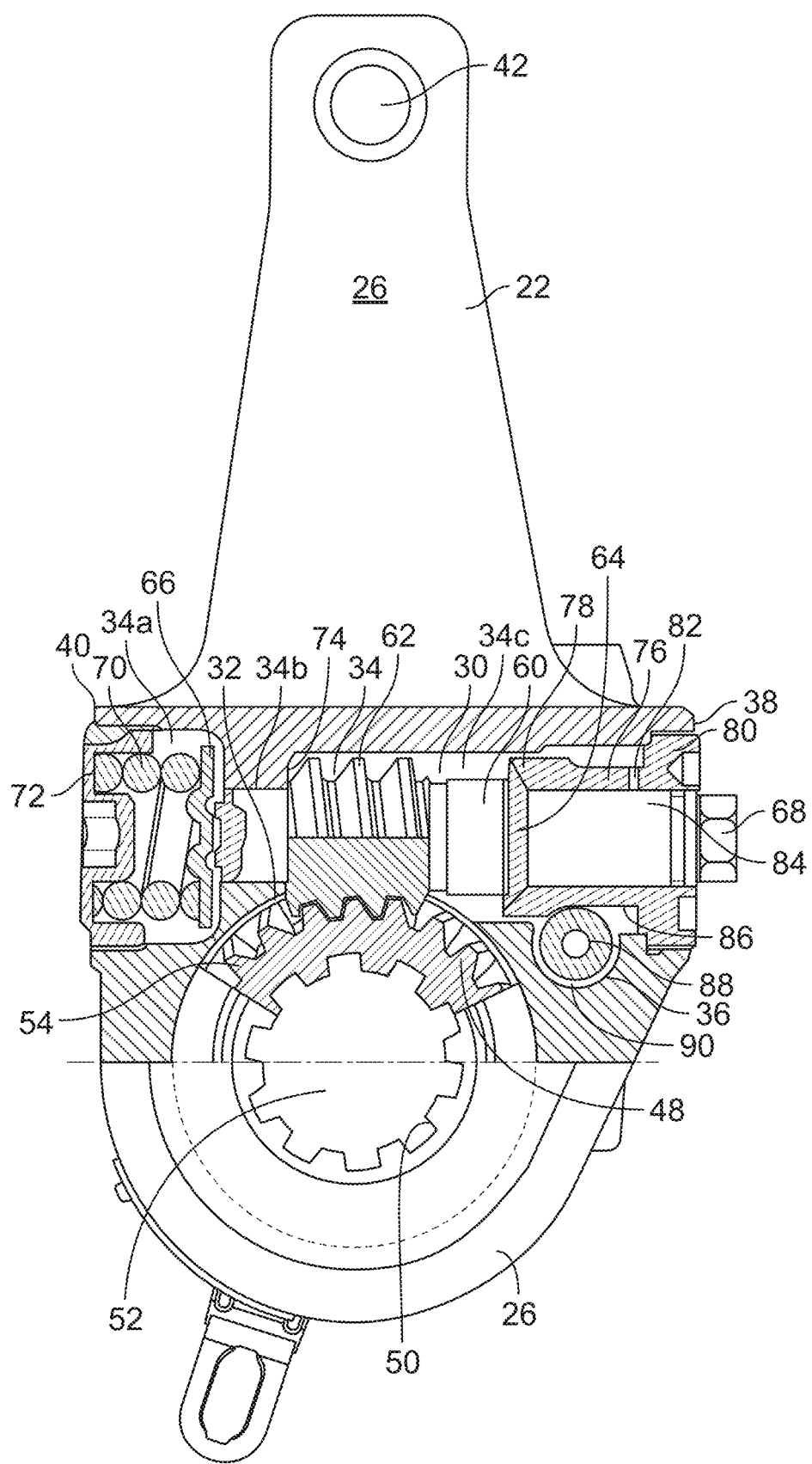
FIG. 3 is a partial cross-sectional view of the brake adjuster taken through the line 3-3 in FIG. 2.
Figure 5:
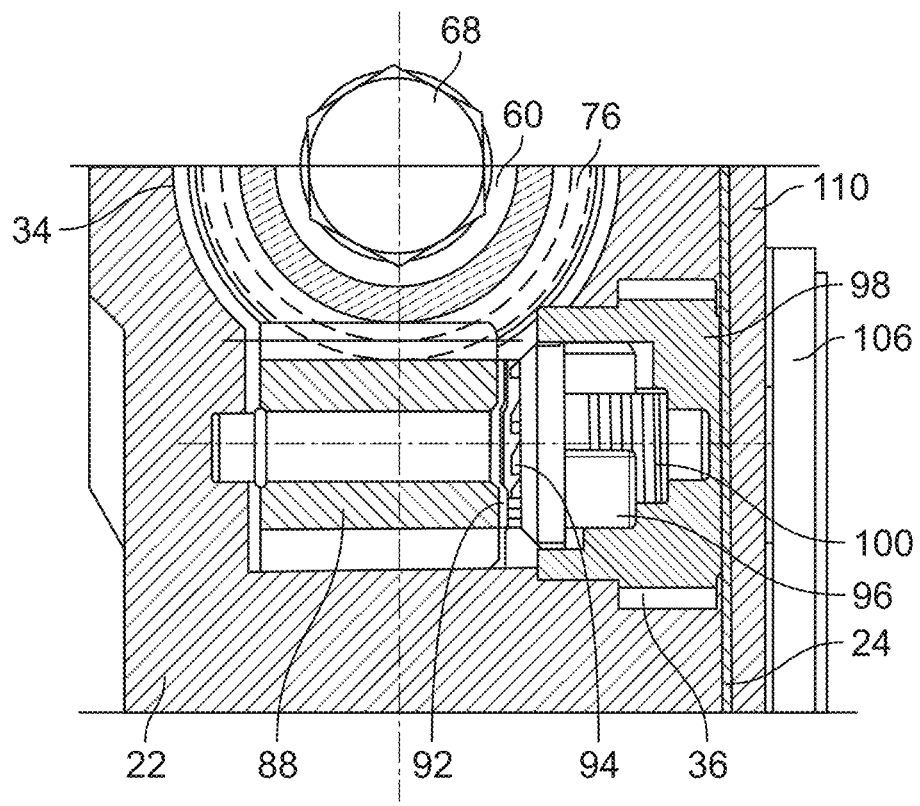
FIG. 5 is a detail view of a portion of the brake adjuster shown in FIG. 2.

Brake adjuster 20 includes a housing 22 with a front surface 24 shown in FIG. 1 and a rear surface 26 shown in FIG. 3. Housing 22 has a base 27 and a lever arm 28 extending outward from the base 27. As shown in FIG. 3, a cavity 30 is formed in base 27. Cavity 30 is formed from intersecting bores 32, 34, and 36. Bore 32 is generally cylindrical, is positioned in base 27, and extends from front surface 24 to rear surface 26. Bore 34 extends between sides 38 and 40 of base 27. Bore 34 intersects bore 32, and bore 34 is generally perpendicular and generally tangent to bore 32. As shown in FIG. 5, bore 36 extends from front surface 24 through approximately three-quarters of base 27. Bore 36 intersects bore 34, and bore 36 is generally perpendicular and generally tangent to bore 34. As shown in FIG. 1, a portion of bore 36 adjacent front surface 24 intersects and is generally parallel to bore 32. Lever arm 28 (FIG. 1) includes an opening 42 (FIG. 3) at an end of housing 22 opposite bore 32. Opening 42 receives a pin 44 (FIG. 1) to join a brake actuator push rod 46 to brake adjuster 20.

A worm wheel 48 is positioned in bore 32 of base 27. Worm wheel 48 includes a splined, internal surface 50 surrounding an opening 52. Splined, internal surface 50 engages a cam shaft (not shown) that is received by opening 52. Worm wheel 48 includes an outer surface with gear teeth 54 (FIG. 3). Worm wheel 48 is mounted in housing 22 with o-rings 56 and 58, shown in FIG. 4, so that worm wheel 48 can rotate freely with respect to housing 22 and seal internal components from contamination. Rotation of the worm wheel 48 rotates the cam shaft (not shown) received by opening 52 to apply or release a vehicle's brake.

Referring to FIG. 3, a worm screw 60 is positioned within bore 34. Worm screw 60 includes gear teeth 62 that engage the teeth 54 on worm wheel 48. Worm screw 60 has a semi-conical clutch surface 64 with conical teeth. One end of worm screw 60 abuts a thrust washer 66, and the opposite end of worm screw 60 has a hexagonal bolt head 68 that extends out of housing 22 for engagement with a tool to manually rotate worm screw 60 to adjust the positioning of the brake adjuster 20 and the clearance between the brake shoes and brake drum during installation. A compression spring 70 is positioned within bore 34 between thrust washer 66 and a spring cover 72 that is threaded into housing 22. Compression spring 70 biases thrust washer 66 and worm screw 60 to the right, when viewed as shown in FIG. 3, towards a clutch wheel 76.

Bore 34 includes a first portion 34a that receives spring 70 and thrust washer 66, a second portion 34b that receives the end of worm screw 60 adjacent thrust washer 66, and a third portion 34c that receives the remainder of worm screw 60. Third portion 34c has a greater diameter than second portion 34b such that housing 22 has an annular surface 74 at the transition between second and third portions 34b-c. Gear teeth 62 of worm screw 60 are dimensioned such that they abut annular surface 74 of housing 22 when compression spring 70 is compressed, as shown in FIG. 3 and described in more detail below.

A clutch wheel 76 is positioned in third portion 34c of bore 34. Clutch wheel 76 includes a conical clutch surface 78 with conical teeth that engage the conical teeth of the clutch surface 64 of worm screw 60 when spring 70 biases clutch surface 64 into contact with clutch surface 78. A cover 80 threaded into housing 22 retains clutch wheel 76 within bore 34. A bearing 82 is positioned between cover 80 and clutch wheel 76 so that clutch wheel 76 can rotate with respect to cover 80. A portion of worm screw 60 extends through an opening 84 in the center of clutch wheel 76 and cover 80. Clutch wheel 76 includes gear teeth 86 that are described in more detail below with respect to FIGS. 6-13.

A control screw 88 (FIG. 5) is positioned within bore 36 of housing 22. Control screw 88 has an outer surface 90 (FIG. 3) with gear teeth that engage the gear teeth 86 of clutch wheel 76. Referring to FIG. 5, control screw 88 has a clutch surface 92 at one end that engages a mating clutch surface 94 of a carrier wheel 96 to form a one way clutch such that when carrier wheel 96 rotates in one direction (the clockwise direction when viewed in FIG. 1) it forces control screw 88 to rotate but that when carrier wheel 96 rotates in the opposite direction (the counter-clockwise direction when viewed in FIG. 1) control screw 88 is stationary.

Carrier wheel 96 is partially positioned inside a cavity formed within a pinion 98. A torsion spring 100 is positioned between the carrier wheel 96 and pinion 98. Carrier wheel 96 rotates to a limited extent between stops (not shown) formed in pinion 98 such that when carrier wheel 96 rotates to either end of its rotational limit within pinion 98, further rotation of pinion 98 also rotates carrier wheel 96 in the same direction as the rotation of pinion 98. The rotation of carrier wheel 96 within pinion 98 corresponds to the desired slack between the brake shoes (not shown) and brake drum (not shown). Thus, the control distance or A-distance for the brake adjuster 20 is accordingly defined between the pinion 98 and carrier wheel 96. Torsion spring 100 acts to torque carrier wheel 96 in the clockwise direction when viewed as shown in FIG. 1 such that clutch surface 94 of carrier wheel 96 engages clutch surface 92 of control screw 88. Torsion spring 100 is tensioned between the carrier wheel 96 and pinion 98 when the brakes are not applied.

Figure 4:
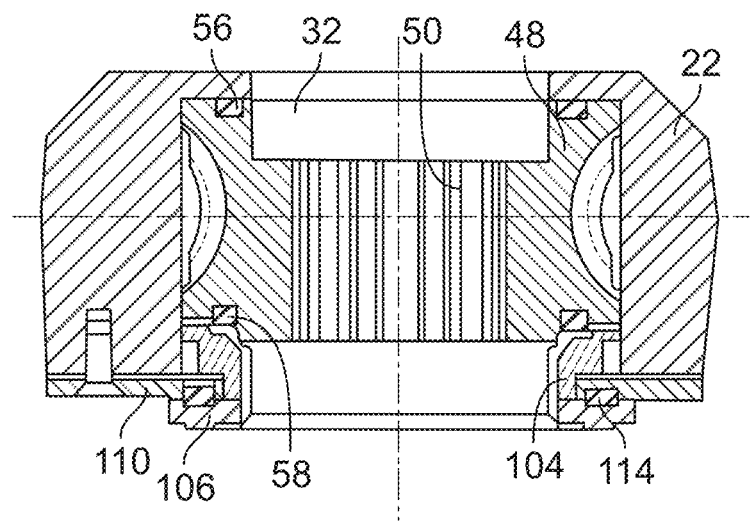
FIG. 4 is a partial cross-sectional view of the brake adjuster taken through the line 4-4 in FIG. 1.

Referring to FIG. 1, a control unit 102 includes a control disc 104 with a peripheral edge having teeth that engage teeth on a peripheral edge of pinion 98. Control disc 104 is connected to a control ring 106 that has a control arm 108 extending beyond housing 22. Control arm 108 includes an elongated slot 108a adjacent a free end of the control arm 108 opposite from control ring 106. A fastener 109 extends through the slot 108a to couple the control unit 102 to a bracket 111 that is mounted to a fixed part of the chassis of the vehicle on which brake adjuster 20 is mounted. The bracket 111 includes an elongated slot 111a that permits the control unit 102 to be adjusted to a desired position before the fastener 109 is tightened to fix the control unit 102 to the bracket 111. Joining the control arm 108 to the bracket 111 and vehicle chassis provides a reference or control signal for the brake adjuster 20 in that the control unit 102 does not rotate when the brake actuator push rod 46 extends or retracts to rotate the housing 22 of the brake adjuster 20. As shown in FIG. 1, a cover plate 110 is mounted to the front surface 24 of housing 22 with screws, one of which is identified as 112. As shown in FIG. 4, cover plate 110 is positioned between housing 22 and control ring 106, and an o-ring 114 is positioned between a portion of cover plate 110 and control ring 106. O-ring 114 allows control unit 102 to rotate with respect to housing 22 and seals internal components from contamination. Control disc 104 is positioned within bore 32 adjacent worm wheel 48. Control disc 104 is operable to rotate with respect to worm wheel 48 via o-ring 58.

Referring to FIG. 1, brake adjuster 20 includes a brake stroke indication system that allows an operator or maintenance technician to visually determine the stroke of the brake actuator push rod 46, which allows the operator or technician to determine whether the brake adjuster 20 is installed correctly and maintaining proper brake adjustment. The brake stroke indication system includes a first notch 116 and a second notch 118 that are formed in the cover plate 110. Further, the control unit 102 includes a pointer 120 that is integrally formed with and extends radially outward from the control ring 106. FIG. 1 shows the pointer 120 positioned so that it is generally aligned with the first notch 116. More specifically, a leading edge 121 of the pointer 120 is positioned so that it is aligned with a leading edge 117 of the first notch 116, which is an indication that the brake actuator push rod 46 is retracted to a brake disengaged position. The first notch 116 is positioned on the cover plate 110 in a location where the pointer 120 can be generally aligned with the first notch 116 during installation of the brake adjuster 20 as an indication that the brake actuator push rod 46 is retracted to a brake disengaged position or "home" position. As is generally known in the art, when brake adjuster 20 is initially installed with a drum brake system, for example, the brake adjuster 20 is used to set the brake shoes a desired distance from the brake drum when the brake actuator push rod 46 is retracted, i.e., the brake actuator is not actuated to extend the brake actuator push rod 46. When installed in this manner, the pointer 120 is also aligned with the first notch 116 as an indication that the brake actuator push rod 46 is retracted.

Figure 6:
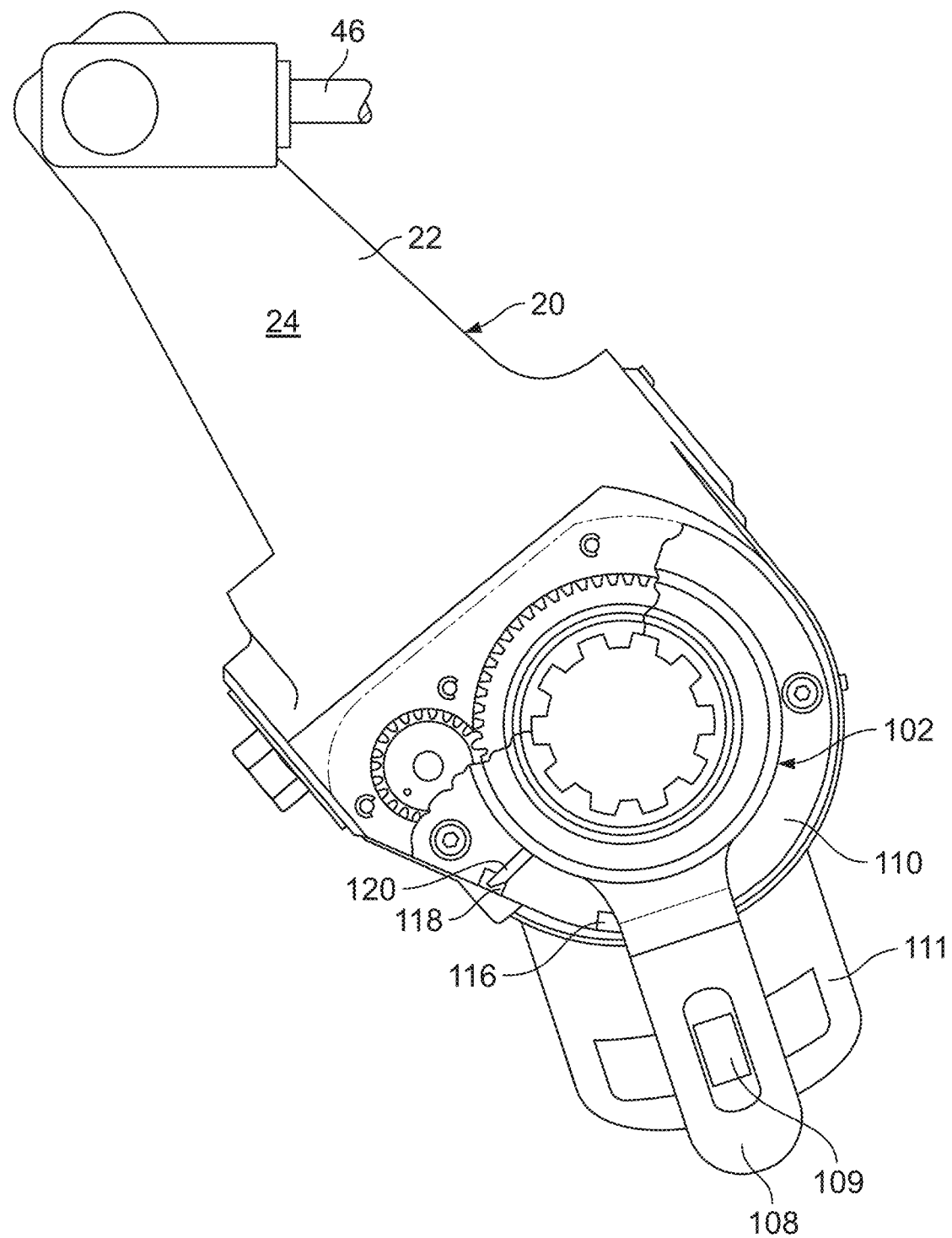
FIG. 6 is a front elevational view of the brake adjuster shown in FIG. 1 showing the brake adjuster when the brake actuator push rod is extended to a brake over-stroke position.

Referring to FIG. 6, the pointer 120 is shown as being generally adjacent to the second notch 118. More specifically, the leading edge 121 of the pointer 120 is positioned in front of the second notch 118. The second notch 118 is positioned on the cover plate 110 in a location that provides an indication of when the brake actuator push rod 46 is extended to a brake over-stroke position. For example, as the brake actuator push rod 46 extends outward from right to left, as shown in FIGS. 1 and 6, the housing 22 of the brake adjuster 20 and the notches 116 and 118 rotate in a counter-clockwise direction with respect to the control unit 102 and pointer 120. Thus, as the brake actuator push rod 46 extends, the notches 116 and 118 rotate in a counter-clockwise direction with respect to the pointer 120. The notches 116 and 118 are spaced apart a particular distance from each other that corresponds to a length of extension of the brake actuator push rod 46 that indicates that the push rod is out-of-stroke or in an over-stroke condition. As is generally known, when a brake actuator push rod is in an over-stroke condition, it takes more time to slow or stop the vehicle on which the brakes are installed than if the brake actuator push rod is operating within a normal range of extension. When the brake actuator push rod is in an over-stroke condition, the vehicle will travel farther before stopping after the brakes are applied.

In one exemplary embodiment, the brake adjuster 20 may be configured for use with at least two different types of brake actuators, a first brake actuator having a brake actuator push rod with a first normal operating range of extension, and a second brake actuator having a brake actuator push rod with a second normal operating range of extension. The first normal operating range of extension for the first brake actuator refers to the desired range of distance of extension of the brake actuator push rod from a retracted position outward from the brake actuator toward the brake adjuster when the brake system is operating within a desired range of stroke. For example, the desired range of extension may be extension of up to two inches from the retracted or unactuated position. Likewise, the second normal operating range of extension for the second brake actuator may be extension of up to two and a half inches from the retracted or unactuated position.

The first notch 116 may correspond with the free stroke length of each type of brake actuator. For example, if the brake adjuster 20 is installed as shown in FIG. 1 so that the leading edge 121 of the pointer 120 is aligned with the leading edge 117 of the first notch 116 when the brake actuator is in a retracted position, extension of the brake actuator push rod 46 will initially cause rotation of the housing 22 and first notch 116 in a counter-clockwise direction. Travel of the leading edge 121 of the pointer 120 across the first notch 116 from the leading edge 117 to the trailing edge 119 corresponds to the free stroke of the brake system, or the distance of travel of the brake actuator push rod 46 from a retracted position to a partially extended position where the brake shoes first contact the brake drums. Thus, when the leading edge 121 of the pointer 120 reaches the trailing edge 119 of the first notch 116, the free stroke of the brake system is complete and the brake shoes first make contact with the brake drum. The distance of extension of the brake actuator push rod 46 during the free stroke may be, for example, approximately ⅜ inches.

When configured for use with two different types of brake actuators, the area of the cover plate 110 between the first and second notches 116 and 118 may correspond to the normal operating range of extension for the first brake actuator. For example, as the first brake actuator extends and retracts within its normal operating range, the leading edge 121 of pointer 120 will remain in front of the area between the first and second notches 116 and 118. When the push rod of the first brake actuator extends outward past its normal operating range to an over-stroke position, the leading edge 121 of pointer 120 will exit the area between the first and second notches 116 and 118 and either be positioned directly past the leading edge of second notch 118 or past the second notch 118 on the opposite side of the second notch 118 as the area between the first and second notches 116 and 118. When the housing 22 rotates to a position where the leading edge 121 of the pointer 120 is positioned past the leading edge of second notch 118, an operator can view the adjuster 20 and determine that the brake actuator is in an over-stroke condition for the first brake actuator.

When the adjuster 20 is used with a second brake actuator having a longer normal operating range of extension than the operating range of extension for the first brake actuator (e.g., two inches for the first brake actuator versus two and a half inches for the second brake actuator), the area between the first and second notches 116 and 118 and the area in front of the second notch 118 may all correspond to the normal operating range of extension for the second brake actuator. Thus, when the second brake actuator extends and retracts within its normal operating range, the leading edge 121 of pointer 120 will remain either in front of the area between the first and second notches 116 and 118 or in front of the second notch 118. When the push rod of the second brake actuator extends outward past its normal operating range to an over-stroke position, the leading edge 121 of the pointer 120 will exit the area in front of the second notch 118 and be positioned past the second notch 118 on the opposite side of the area between the first and second notches 116 and 118, as shown in FIG. 6. When the housing 22 rotates so that the pointer 120 is positioned past the second notch 118, an operator can view the adjuster 20 and determine that the brake actuator is in an over-stroke condition for the second brake actuator.

Figure 2:
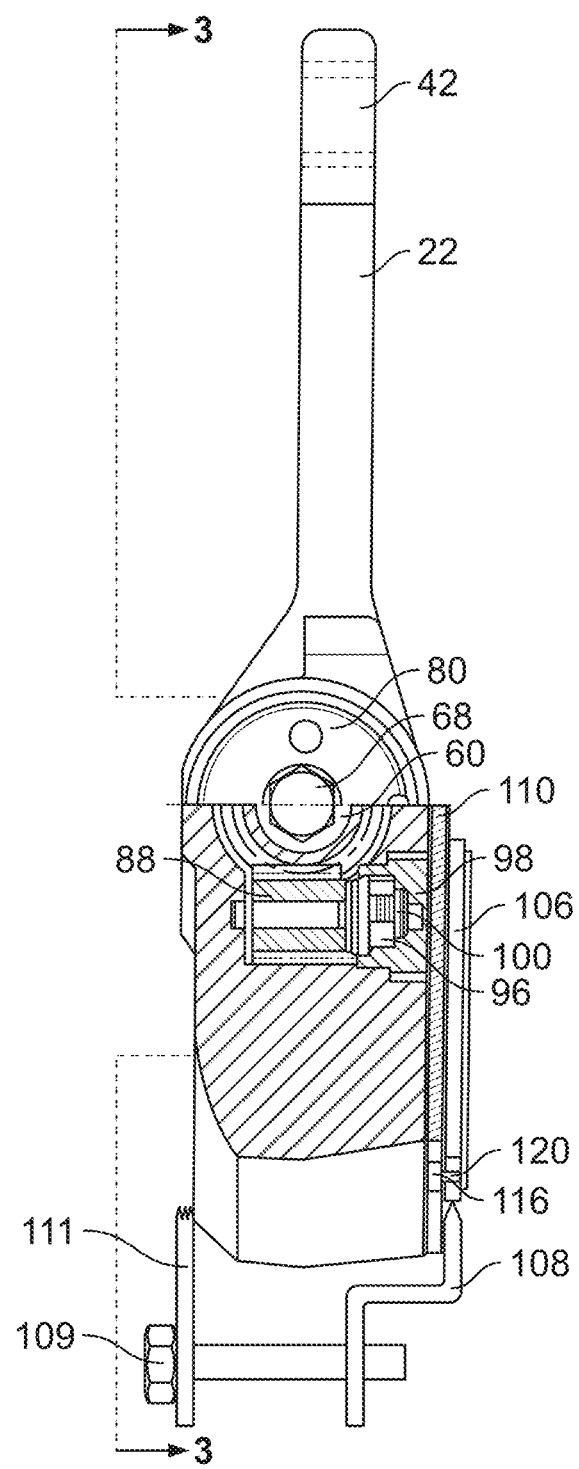
FIG. 2 is a partial cross-sectional view of the brake adjuster taken through the line 2-2 in FIG. 1.

Because the notches 116 and 118 extend to the peripheral edge of the cover plate 110, an operator can view the pointer 120 and notches 116 and 118 from a side of the adjuster 20, for example as shown in FIG. 2. The pointer 120 and notches 116 and 118 may even be partly visible when viewing the side of the brake adjuster 20 at an angle, for example if the brake adjuster 20 is rotated from the view shown in FIG. 2 around a vertical axis until the back and side are each visible. In this manner, an operator may view the brake adjuster from different sides and angles to determine the stroke of the brake actuator push rod 46. For example, the pointer 120 and notches 116 and 118 may be visible by an operator if the adjuster 20 is used in either a left-hand or right-hand configuration.

Upon viewing that the brake actuator is in an over-stroke condition, the operator or maintenance technician can service the brake system of the vehicle to ensure that the brake actuator push rod is operating within a desired range of extension, or is "within stroke." Incorporation of the notches 116 and 118 and pointer 120 into the brake adjuster 20 eliminates the need to use a scale or ruler to perform a manual measurement of the amount of extension of the brake actuator push rod outward from the unactuated position. Further, because the brake stroke indication system is built in to the cover plate 110 and control unit 102 of the adjuster 20, no additional parts need to be added to the adjuster 20 for measuring brake stroke. For example, the brake stroke indication system of adjuster 20 does not need an additional pointer or gauge to be coupled to the adjuster or brake stroke push rod, thereby reducing the likelihood that the indication system will fail or break.

The notches 116 and 118 may be formed in any desirable manner on the cover plate 110. For example, they may be machined or punched in the cover plate 110. The notches 116 and 118 may further be substituted for any type of visual indicator. For example, in lieu of notches 116 and 118, indicators such as protrusions, decals, paint, marks, or other types of visual indicators may be used. The pointer 120 may further be substituted for any type of visual indicator. For example, in lieu of pointer 120, indicators such as protrusions, decals, notches, paint, marks, or other types of visual indicators may be used.

Although adjuster 20 is described as capable of being used with two different types of brake actuators, a first brake actuator with a first normal operating range of extension, and a second brake actuator with a second normal operating range of extension that is longer than that of the first brake actuator, it is within the scope of the invention for the adjuster 20 to only be configured for use with a single type of brake actuator. For example, the first and second notches 116 and 118 may be spaced so that when the pointer 120 is positioned in front of the second notch 118, the adjuster 20 indicates that the single type of brake actuator is in an over-stroke position. Further, the adjuster 20 may be configured for use with more than two types of brake actuators by including more notches or more visual indicators on the cover plate 110. For example, the adjuster 20 may be configured for use with a third actuator having a longer stroke than the first and second actuators described above. In such a configuration, an additional visual indicator, such as a notch, may be positioned above the second notch 118 shown in FIG. 1. When the pointer 120 is adjacent this additional visual indicator, the adjuster 20 visually indicates that the third type of brake actuator is in an over-stroke position.

Figure 7:
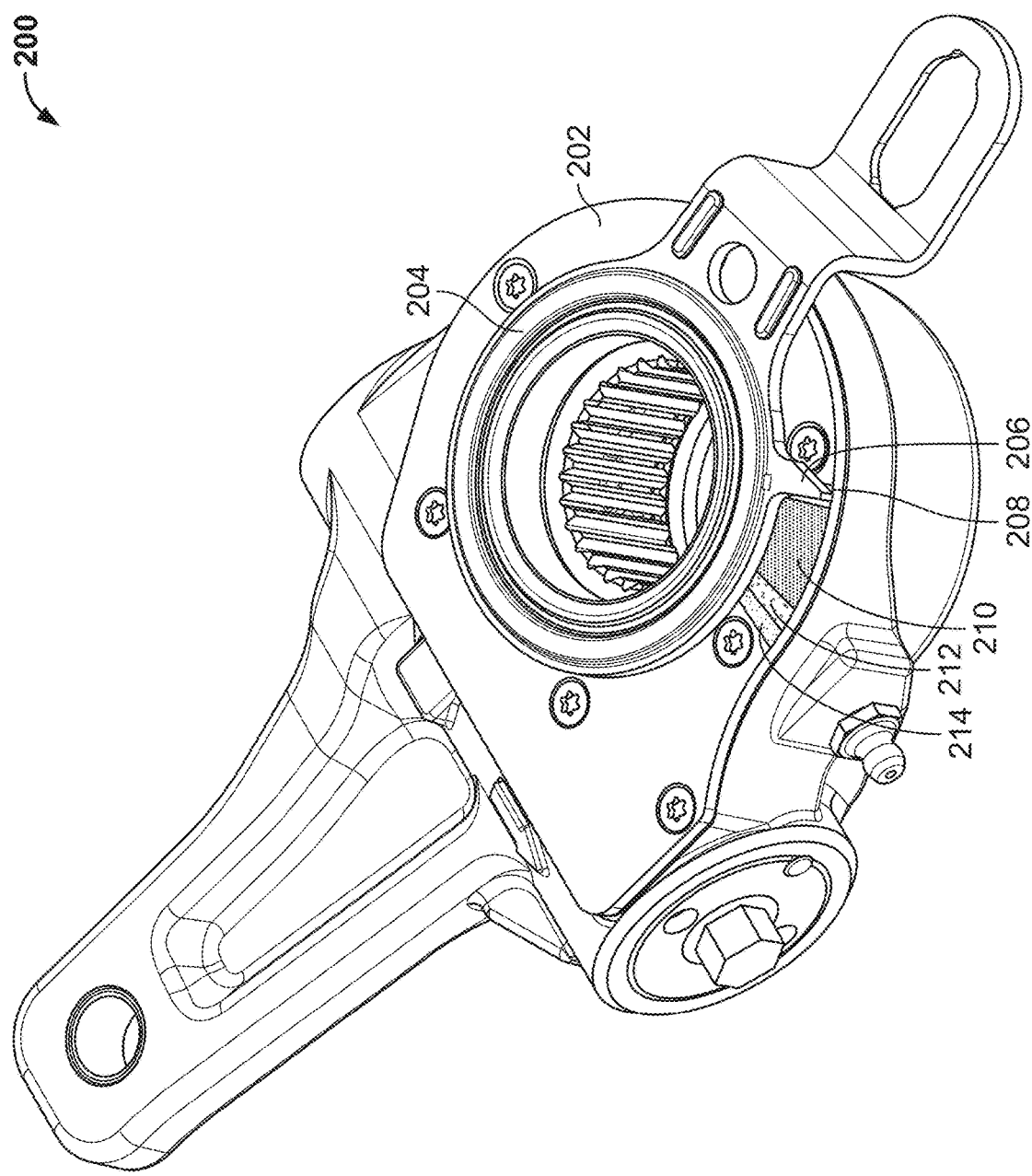
FIG. 7 is a perspective view of another embodiment of brake adjuster in accordance with the invention disclosed herein.
Figure 8:
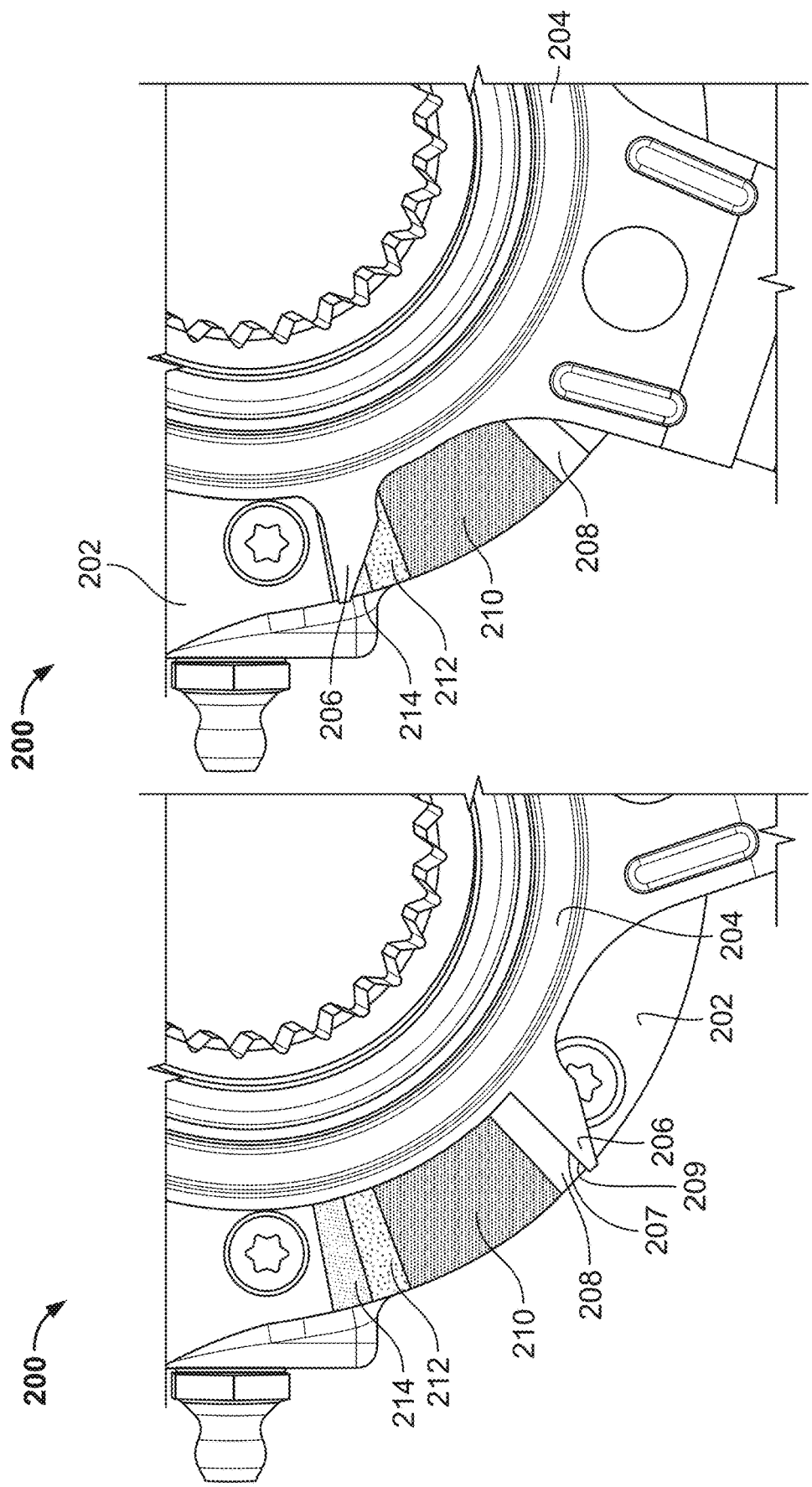
FIG. 8A is a detail view of the brake adjuster shown in FIG. 7 showing the brake adjuster when a brake actuator push rod is retracted in a brake disengaged position.
FIG. 8B is a detail view of the brake adjuster shown in FIG. 7 showing the brake adjuster when the brake actuator push rod is extended to a brake over-stroke position.

FIGS. 7-12 show alternative embodiments of brake adjusters with brake stroke indication systems. For example, FIGS. 7-8B show an embodiment of brake adjuster 200 with a cover plate 202 that has colored marks corresponding to brake actuator push rod ranges of extension. The control unit 204 of adjuster 200 has a pointer 206 and is substantially the same as the control unit 102 of brake adjuster 20 described above. Referring to FIGS. 8A-B, the cover plate 202 has a first mark 208, a second mark 210, a third mark 212, and a fourth mark 214. The leading edge 209 of the first mark 208 is configured to be aligned with the leading edge 207 of the pointer 206, as shown in FIG. 8A, when the brake actuator push rod is retracted to a brake disengaged position in the same manner as described above with respect to alignment of the pointer 120 with first notch 116. The leading edge 207 of the pointer 206 is positioned in front of the first mark 208 during the free stroke of the brake actuator in the same manner as described above with respect to first notch 116. The second mark 210 is aligned with the pointer 206 when the brake actuator push rod is in a normal operating range of extension in the same manner as the area between the first and second notches 116 and 118 described above. The third mark 212 is aligned with the pointer 206 when a first type of brake actuator is in an over-stroke position, or when a second type of brake actuator having a longer normal operating range of extension than the first brake actuator is in a normal operating range of extension in the same manner as the second notch 118 described above. The fourth mark 214 is aligned with the pointer 206, as shown in FIG. 8B, when either of the first or second types of brake actuators are in an over-stroke position in the same manner as the area outside of the second notch 118 described above. Each of the first mark 208, second mark 210, third mark 212, and fourth mark 214 may be different colors. For example, the first mark 208 may be white, the second mark 210 may be green, the third mark 212 may be yellow, and the fourth mark 214 may be green. The marks 208, 210, 212, and 214 may be formed by painting or otherwise marking or coloring the cover plate 202. The marks 208, 210, 212, and 214 may further be formed by applying one or more decals to the cover plate 202. Other than the differences specifically described above, brake adjuster 200 is otherwise structured and operates in substantially the same manner as the brake adjuster 20 described herein.

Figure 9:
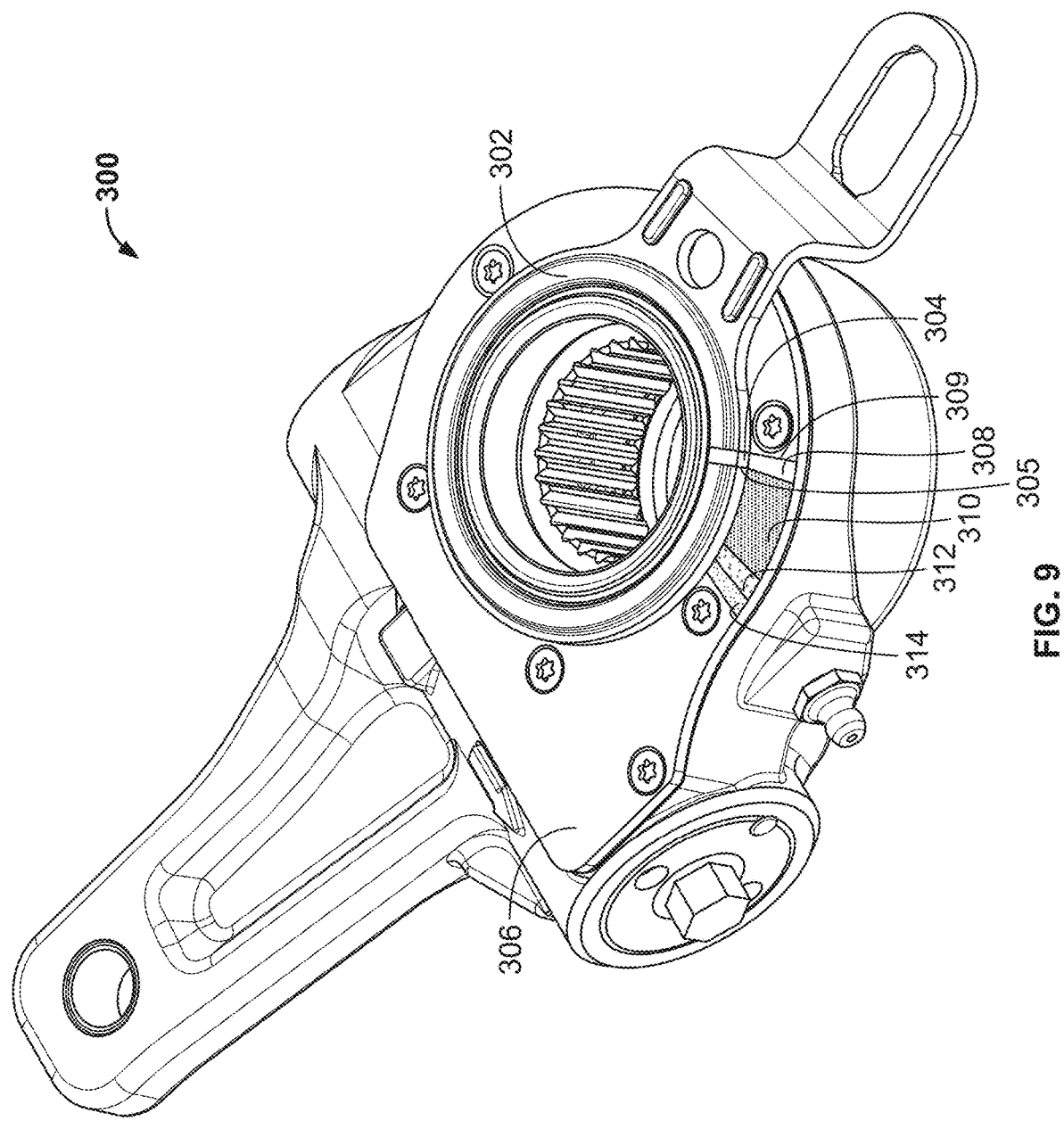
FIG. 9 is a perspective view of a third embodiment of brake adjuster in accordance with the invention disclosed herein.

FIGS. 9-10B show an embodiment of brake adjuster 300 that is substantially similar to the brake adjuster 200 described above except that the control unit 302 has a colored mark 304 instead of a pointer. The cover plate 306 of adjuster 300 has a first mark 308, a second mark 310, a third mark 312, and a fourth mark 314 and is substantially the same as the cover plate 202 of brake adjuster 200 described above. The leading edge 309 of the first mark 308 is configured to be aligned with the leading edge 305 of the mark 304 on control unit 302, as shown in FIG. 10A, when the brake actuator push rod is retracted to a brake disengaged position in the same manner as described above with respect to alignment of the pointer 120 with first notch 116. The leading edge 305 of the mark 304 is positioned adjacent the first mark 308 during the free stroke of the brake actuator in the same manner as described above with respect to first notch 116. The second mark 310 is aligned with the mark 304 when the brake actuator push rod is in a normal operating range of extension in the same manner as the area between the first and second notches 116 and 118 described above. The third mark 312 is aligned with the mark 304 when a first type of brake actuator is in an over-stroke position, or when a second type of brake actuator having a longer normal operating range of extension than the first brake actuator is in a normal operating range of extension in the same manner as the second notch 118 described above. The fourth mark 314 is aligned with the mark 304, as shown in FIG. 10B, when either of the first or second types of brake actuators are in an over-stroke position in the same manner as the area outside of the second notch 118 described above. The first mark 308, second mark 310, third mark 312, and fourth mark 314 may each be different colors and be formed in the same manner as the marks of adjuster 200 described above. The mark 304 on control unit 302 may be formed by painting or otherwise marking or coloring the control unit 302. The mark 304 may further be formed by applying one or more decals to the control unit 302. The mark 304 and first mark 308 may be the same color, for example white. Other than the differences specifically described above, brake adjuster 300 is otherwise structured and operates in substantially the same manner as the brake adjuster 20 described herein.

FIGS. 11A-B show another alternative embodiment of brake adjuster 400 that is substantially similar to the brake adjuster 300 described above except that the position of the marks are reversed on the brake adjuster 400. Brake adjuster 400 has a control unit 402 with a first mark 404, a second mark 406, a third mark 408, and a fourth mark 410. A cover plate 412 of brake adjuster 400 has a single mark 414 with a tip 415. The leading edge 405 of the first mark 404 is configured to be aligned with the tip 415 of the mark 414 on the cover plate 412, as shown in FIG. 11A, when the brake actuator push rod is retracted to a brake disengaged position in the same manner as described above with respect to alignment of the pointer 120 with first notch 116. The tip 415 of the mark 414 is positioned between the edges of the first mark 404 during the free stroke of the brake actuator in the same manner as described above with respect to first notch 116. The second mark 406 is aligned with the mark 414 when the brake actuator push rod is in a normal operating range of extension in the same manner as the area between the first and second notches 116 and 118 described above. The third mark 408 is aligned with the mark 414 when a first type of brake actuator is in an over-stroke position, or when a second type of brake actuator having a longer normal operating range of extension than the first brake actuator is in a normal operating range of extension in the same manner as the second notch 118 described above. The fourth mark 410 is aligned with the mark 414, as shown in FIG. 11B, when either of the first or second types of brake actuators are in an over-stroke position in the same manner as the area outside of the second notch 118 described above. The first mark 404, second mark 406, third mark 408, fourth mark 410 and mark 414 may each be different colors and be formed in the same manner as the marks of adjusters 200 and 300 described above. Other than the differences specifically described above, brake adjuster 400 is otherwise structured and operates in substantially the same manner as the brake adjuster 20 described herein.

Figure 12:
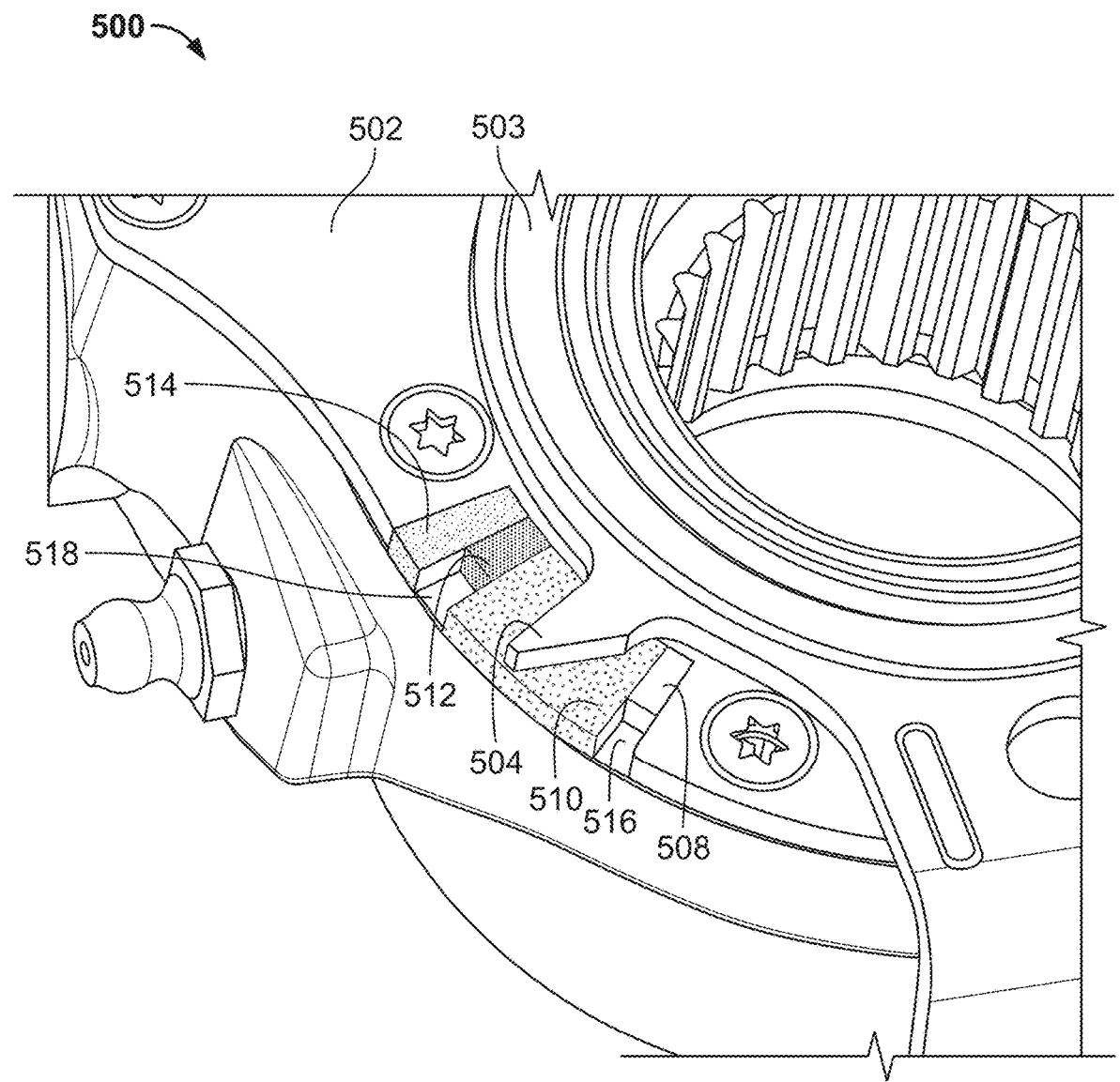
FIG. 12 is a perspective view of a portion of a fifth embodiment of brake adjuster in accordance with the invention disclosed herein.

FIG. 12 shows one further alternative embodiment of brake adjuster 500 that is substantially similar to the brake adjuster 200 described above except that two notches are formed in the cover plate 502 corresponding to two of the marks. Brake adjuster 500 includes a control unit 503 with a pointer 504. The adjuster 500 further includes a first mark 508, a second mark 510, a third mark 512, and a fourth mark 514 on cover plate 502. A first notch 516 is formed in the cover plate 502 adjacent the first mark 508, and a second notch 518 is formed in the cover plate 502 adjacent the third mark 512. The first notch 516 and second notch 518 each extend from a peripheral edge of the cover plate 502 radially inward toward the first mark 508 and third mark 512, respectively. The first notch 516 and second notch 518 may enhance visibility of the position of the pointer 504 relative to the marks 508, 510, 512, and 514. For example, as described above with respect to brake adjuster 20, the relative position of the pointer 504 with respect to the first and second notches 516 and 518 may be seen from the side and back of the adjuster 500 in addition to from the front of the adjuster 500. The various positions of the pointer 504 relative to the marks 508, 510, 512, and 514 have the same meanings as described above with respect to adjuster 200. Other than the differences specifically described above, brake adjuster 500 is otherwise structured and operates in substantially the same manner as the brake adjuster 20 described herein.

While the following description of the operation of brake adjuster 20 refers to its use in a brake system including brake shoes (not shown) and a brake drum (not shown), brake adjuster 20 may also be used in a brake system including brake pads (not shown) and a brake disc (not shown) to maintain the desired clearance between the pads and disc. Further, while the following description refers to brake adjuster 20, brake adjusters 200, 300, 400, and 500 operate in a substantially similar manner.

In operation, brake adjuster 20 is connected to brake actuator push rod 46 (FIG. 1) and a cam shaft (not shown) that is received by opening 52. In response to a linearly directed force from push rod 46 that rotates brake adjuster 20 in a counter-clockwise direction as shown in FIG. 1, brake adjuster 20 applies a torque to the cam shaft also directed in a counter-clockwise direction. The cam shaft received by opening 52 is connected to a brake shoe (not shown) that is spaced a desired distance from a brake drum (not shown) when the vehicle's brakes are not applied. When the brake actuator push rod 46 applies a force to brake adjuster 20, the torque applied to the cam shaft causes the cam shaft to rotate until the brake shoe makes contact with the brake drum. Further application of force by the push rod 46 causes the brake shoe to apply force to the brake drum for slowing and/or stopping the vehicle. Over time, the slack or distance between the brake shoe and brake drum when the brakes are not applied may increase to an amount that is greater than desired. The slack increase may be caused by, for example, wear of the brake shoe lining after repeated application of the brakes. In the manner described below, as the brake adjuster 20 rotates to apply force from push rod 46 to the cam shaft, brake adjuster 20 automatically adjusts the slack between the brake shoe and brake drum to remain at a desired amount.

For purposes of the following description of the operation of brake adjuster 20, it is assumed that the slack between the brake shoe (not shown) and brake drum (not shown) is greater than a desired amount. Prior to the application of force to brake adjuster 20 by brake actuator push rod 46, torsion spring 100 (FIG. 5) is tensioned between carrier wheel 96 and pinion 98. The torque applied by torsion spring 100 to carrier wheel 96 is not great enough to drive the carrier wheel 96, control screw 88, clutch wheel 76, worm screw 60 and worm wheel 48, when conical clutch surfaces 64 and 78 (FIG. 3) are engaged. As brake adjuster 20 rotates due to a force applied by push rod 46, clutch surfaces 64 and 78 are engaged until the brake shoes contact the brake drum.

When push rod 46 applies a force to brake adjuster 20 causing the housing 22 of brake adjuster 20 to rotate, control disc 104 remains stationary due to its connection with a fixed part of the vehicle's chassis (not shown), and pinion 98 rotates in a counter-clockwise direction as shown in FIG. 1 with respect to the control disc 104. At the first part of the brake application movement, pinion 98 initially rotates with respect to carrier wheel 96 (FIG. 5) a distance corresponding to the play between the pinion 98 and carrier wheel 96. As the pinion 98 rotates, the torque of the torsion spring 100 decreases. If the slack between the brake shoes (not shown) and brake drum (not shown) is more than desired, the pinion 98 will rotate to a position where it engages carrier wheel 96 and causes the carrier wheel 96 to rotate with the pinion 98. Rotation of the carrier wheel 96 in this direction causes the clutch surface 94 of the carrier wheel 96 to rotate with respect to the clutch surface 92 of control screw 88 such that the clutch surfaces 92 and 94 get a new engagement.

When rotation of housing 22 causes the brake shoes (not shown) to engage the brake drum (not shown), the brake drum exerts a counteracting force on the brake shoes that exerts a torque on worm wheel 48 in a counter-clockwise direction as shown in FIG. 3. Worm wheel 48 in turn exerts a force on worm screw 60 that is directed to the left as shown in FIG. 3 toward spring 70. This force causes worm screw 60 to move toward spring 70 compressing it. Movement of worm screw 60 causes clutch surface 64 to disengage clutch surface 78. Worm screw 60 moves until annular surface 74 of housing 22 abuts the gear teeth 62 of worm screw 60. As the brakes are applied, force is transmitted from push rod 46 to housing 22, from the annular surface 74 of housing 22 to worm screw 60, from worm screw 60 to worm wheel 48, and from worm wheel 48 to the cam shaft (not shown), brake shoes (not shown), and brake drum (not shown).

When the brakes are applied and clutch surfaces 64 and 78 (FIG. 3) disengage, clutch wheel 76 can rotate without driving worm screw 60. When the brakes are released, initially the clutch surfaces 64 and 78 remain disengaged. Pinion 98 rotates in a clockwise direction as shown in FIG. 1 with respect to the stationary control disc 104. Pinion 98 drives the carrier wheel 96 and control screw 88 via torsion spring 100 in the clockwise direction as viewed from FIG. 1. Control screw 88 drives clutch wheel 76 in the clockwise direction as viewed in FIG. 5. As the clutch surfaces 64 and 78 are still disengaged, the worm screw 60 is not driven.

When the brake shoes (not shown) are about to leave their engagement with the brake drum (not shown), the force exerted on worm screw 60 by compression spring 70 begins to exceed the force exerted on worm screw 60 by worm wheel 48 causing compression spring 70 to move worm screw 60 to the right as shown in FIG. 3 until clutch surfaces 64 and 78 engage each other. When the clutch surfaces 64 and 78 engage each other, the rotational resistance for clutch wheel 76 increases to the extent that its rotation is stopped.

At the continued release movement of the housing 22 (in the clockwise direction as shown in FIG. 1) the pinion 98 rolls on the control disc 104, but the torsion spring 100 cannot turn the carrier wheel 96 and the control screw 88 due to the rotational resistance of the clutch wheel 76. This means that the play between the carrier wheel 96 and the pinion 98 is consumed or in other words that the initial position between these two parts is reinstated, and that the torsion spring 100 is tensioned.

During the remaining and last part of the release stroke of the housing 22, the pinion 98 rolls on the control disc 104 and drives the carrier wheel 96 and control screw 88 in a clockwise direction as viewed in FIG. 1. Control screw 88 drives clutch wheel 76 in a clockwise direction as shown in FIG. 5. Clutch wheel 76 drives worm screw 60 in the same direction. Worm screw 60 drives worm wheel 48 in a clockwise direction as shown in FIG. 3. Worm wheel 48 rotates the cam shaft (not shown), which moves the brake shoes (not shown) closer to the brake drum (not shown) to decrease the distance or slack between the brake shoes and the brake drum. As the decrease at each brake application is relatively minor, several applications may be needed before the slack has been decreased to the desired value.

The above description of the function presupposes that the slack is excessive. If that is not the case, the brake application is virtually the same with the important difference that the clutch surface 94 (FIG. 5) of carrier wheel 96 does not rotate with respect to clutch surface 92 causing the clutch surfaces 92 and 94 to be engaged in a new position. The description above of the release stroke is also valid with the exception that the movement stops when the play between the pinion 98 and the carrier wheel 96 has been consumed. Accordingly, no adjustment occurs.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A brake adjuster comprising:
   a housing comprising a base and a lever arm extending outward from the base, the lever arm configured to be coupled to a brake actuator push rod; and
   a control unit rotatably coupled to the housing, the control unit configured to be coupled to a reference point of a vehicle such that the housing rotates with respect to the control unit as the brake actuator push rod extends outward to apply a brake of the vehicle and retracts to disengage the brake, the control unit further configured to cause adjustment of the brake as the brake actuator push rod retracts,
   wherein one of the housing and the control unit comprises a first indicator and a second indicator, and wherein the other of the housing and the control unit comprises a third indicator, wherein the third indicator is adjacent the first indicator when the brake actuator push rod is retracted in a brake disengaged position, and wherein the third indicator is adjacent the second indicator when the brake actuator push rod is extended to a brake over-stroke position,
   wherein the one of (i) the first indicator and the second indicator or (ii) the third indicator that is part of the housing does not rotate with respect to the lever arm of the housing.

2. The brake adjuster of claim 1, wherein the housing comprises the first indicator and the second indicator, and wherein the control unit comprises the third indicator.

3. The brake adjuster of claim 2, wherein each of the first indicator, the second indicator, and the third indicator is selected from the group consisting of a notch, a protrusion, or a mark.

4. The brake adjuster of claim 2, wherein the first indicator comprises a first notch, the second indicator comprises a second notch, and the third indicator comprises a pointer.

5. The brake adjuster of claim 2, wherein the first indicator comprises a first mark, the second indicator comprises a second mark, and the third indicator is selected from the group consisting of a pointer or a third mark.

6. The brake adjuster of claim 5, wherein the first mark comprises a first color, and the second mark comprises a second color.

7. The brake adjuster of claim 6, further comprising a fourth mark positioned between the first mark and the second mark, the fourth mark comprising a third color and indicating actuation of a first type of brake actuator within a normal operating range.

8. The brake adjuster of claim 7, further comprising a fifth mark positioned between the fourth mark and the second mark, the fifth mark comprising a fourth color and indicating actuation of a second type of brake actuator within a normal operating range.

9. The brake adjuster of claim 5, wherein the first mark and the second mark comprise one or more decals adhered to a portion of the housing.

10. The brake adjuster of claim 5, wherein the first mark and the second mark comprise paint applied to a portion of the housing.

11. The brake adjuster of claim 1, wherein the control unit comprises the first indicator and the second indicator, and wherein the housing comprises the third indicator.

12. The brake adjuster of claim 1, wherein the housing comprises a base and a cover plate joined to the base, wherein the cover plate comprises either (i) the first indicator and the second indicator, or (ii) the third indicator.

13. The brake adjuster of claim 1, wherein the control unit comprises a control disc having teeth, and further comprising a pinion that is rotatably coupled to the housing and that engages the teeth of the control disc.

14. The brake adjuster of claim 13, further comprising:
   a carrier wheel coupled to the pinion with a torsion spring, the pinion and the carrier wheel being configured to allow limited rotation of the carrier wheel with respect to the pinion, and the carrier wheel further comprising a first clutch surface;
   a control screw comprising a second clutch surface that engages the first clutch surface of the carrier wheel, the control screw further comprising teeth;
   a clutch wheel comprising teeth that engage the teeth of the control screw, the clutch wheel further comprising a third clutch surface;
   a worm screw comprising a fourth clutch surface that is configured to engage the third clutch surface; and
   a worm wheel that engages the worm screw and is configured to be coupled with a shaft of the brake.

15. A brake adjuster comprising:
   a housing configured to be coupled to a brake actuator push rod; and
   a control unit rotatably coupled to the housing, the control unit configured to be coupled to a reference point of a vehicle such that the housing rotates with respect to the control unit as the brake actuator push rod extends outward to apply a brake of the vehicle and retracts to disengage the brake, the control unit further configured to cause adjustment of the brake as the brake actuator push rod retracts, wherein the housing comprises a first indicator and a second indicator, and wherein the control unit comprises a third indicator, wherein the third indicator is adjacent the first indicator when the brake actuator push rod is retracted in a brake disengaged position, and wherein the third indicator is adjacent the second indicator when the brake actuator push rod is extended to a brake over-stroke position.

16. The brake adjuster of claim 15, wherein each of the first indicator, the second indicator, and the third indicator is selected from the group consisting of a notch, a protrusion, or a mark.

17. The brake adjuster of claim 15, wherein the first indicator comprises a first notch, the second indicator comprises a second notch, and the third indicator comprises a pointer.

18. The brake adjuster of claim 15, wherein the first indicator comprises a first mark, the second indicator comprises a second mark, and the third indicator is selected from the group consisting of a pointer or a third mark.

19. A brake adjuster comprising:
- a housing configured to be coupled to a brake actuator push rod;
- a control unit rotatably coupled to the housing, the control unit configured to be coupled to a reference point of a vehicle such that the housing rotates with respect to the control unit as the brake actuator push rod extends outward to apply a brake of the vehicle and retracts to disengage the brake, the control unit further configured to cause adjustment of the brake as the brake actuator push rod retracts, wherein the control unit comprises a control disc having teeth,
- wherein one of the housing and the control unit comprises a first indicator and a second indicator, and wherein the other of the housing and the control unit comprises a third indicator, wherein the third indicator is adjacent the first indicator when the brake actuator push rod is retracted in a brake disengaged position, and wherein the third indicator is adjacent the second indicator when the brake actuator push rod is extended to a brake over-stroke position;
- a pinion that is rotatably coupled to the housing and that engages the teeth of the control disc;
- a carrier wheel coupled to the pinion with a torsion spring, the pinion and the carrier wheel being configured to allow limited rotation of the carrier wheel with respect to the pinion, and the carrier wheel further comprising a first clutch surface;
- a control screw comprising a second clutch surface that engages the first clutch surface of the carrier wheel, the control screw further comprising teeth;
- a clutch wheel comprising teeth that engage the teeth of the control screw, the clutch wheel further comprising a third clutch surface;
- a worm screw comprising a fourth clutch surface that is configured to engage the third clutch surface; and
- a worm wheel that engages the worm screw and is configured to be coupled with a shaft of the brake.

* * * * *